US009272601B2

(12) United States Patent
Hara et al.

(10) Patent No.: US 9,272,601 B2
(45) Date of Patent: Mar. 1, 2016

(54) VEHICLE AIR CONDITIONER CASE

(75) Inventors: Junichiro Hara, Tokyo (JP); Tomohiko Shibata, Tokyo (JP); Hiroyuki Yamashita, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 867 days.

(21) Appl. No.: 13/503,121

(22) PCT Filed: Mar. 9, 2011

(86) PCT No.: PCT/JP2011/055457
§ 371 (c)(1),
(2), (4) Date: Apr. 20, 2012

(87) PCT Pub. No.: WO2011/118385
PCT Pub. Date: Sep. 29, 2011

(65) Prior Publication Data
US 2012/0199661 A1  Aug. 9, 2012

(30) Foreign Application Priority Data

Mar. 25, 2010 (JP) ................................ 2010-069915

(51) Int. Cl.
*B60H 1/00* (2006.01)

(52) U.S. Cl.
CPC .......... *B60H 1/00528* (2013.01); *B60H 1/0055* (2013.01); *B60H 1/00514* (2013.01); *B60H 1/00521* (2013.01); *B60H 1/00542* (2013.01)

(58) Field of Classification Search
CPC ........... B60H 1/00521; B60H 1/00528; B60H 1/00514; B60H 1/0055; B60H 1/00542
USPC ........................................... 62/244; 251/143
See application file for complete search history.

(56) References Cited

U.S. PATENT DOCUMENTS 5,954,578 A * 9/1999 Takasaki ........................ 454/121
6,092,385 A * 7/2000 Yoshida ........................... 62/272

(Continued)

FOREIGN PATENT DOCUMENTS

DE  102009057869 A1 * 6/2011
EP       1078786 A2 * 2/2001

(Continued)

OTHER PUBLICATIONS

Japanese Decision to Grant a Patent dated Jul. 22, 2014, issued in corresponding Japanese Patent Application No. 2010-069915 (3 pages), Explanation of Relevancy—"The Decision to Grant a Patent has been received".
International Search Report for PCT/JP2011/055457, dated Jun. 7, 2011.

*Primary Examiner* — Ljiljana Ciric
*Assistant Examiner* — Alexis Cox
(74) *Attorney, Agent, or Firm* — Westerman, Hattori, Daniels & Adrian, LLP (57) ABSTRACT

Provided is a vehicle air conditioner which includes a simple water-proofing structure that is capable of preventing flooding of a vehicle cabin from mating surfaces, etc. of expansion-valve covers and top and bottom divided cases of an air conditioning unit (HVAC unit) without employing a water-proofing cover, or the like. In a vehicle air conditioner in which expansion-valve covers (6 and 7) that are horizontally divided into two parts are provided at an outer surface side of top and bottom divided cases of an air conditioning unit disposed in the vehicle cabin so as to bridge mating surfaces of the cases; an expansion valve can be disposed inside the expansion-valve covers (6 and 7); and, in addition, the interior of the expansion-valve covers (6 and 7) communicates with an engine compartment via an opening provided in a toe board, step portions (11) in which inner surface sides (9) are made lower and outer surface sides (10) are made higher are formed at the top and bottom mating surfaces of the expansion-valve covers (6 and 7).

5 Claims, 5 Drawing Sheets

(56) References Cited

U.S. PATENT DOCUMENTS

| | | | |
|---|---|---|---|
| 6,422,301 B1 * | 7/2002 | Scoccia et al. | 165/42 |
| 8,672,067 B2 * | 3/2014 | Ajisaka | 180/65.21 |
| 2001/0025707 A1 * | 10/2001 | Onda et al. | 165/202 |
| 2003/0042011 A1 * | 3/2003 | Vincent | 165/203 |
| 2003/0136139 A1 * | 7/2003 | Matsunaga et al. | 62/244 |
| 2004/0040330 A1 * | 3/2004 | Kosaka | 62/285 |
| 2007/0062208 A1 * | 3/2007 | Toba | 62/239 |
| 2013/0031925 A1 * | 2/2013 | Tanaka | 62/298 |
| 2014/0119824 A1 * | 5/2014 | Hoehn | 403/375 |

FOREIGN PATENT DOCUMENTS

| | | |
|---|---|---|
| JP | 62-099208 A | 5/1987 |
| JP | 2007-118654 A | 5/2007 |
| JP | 2007-131171 A | 5/2007 |
| JP | 4075689 B2 | 4/2008 |
| JP | 2008-105641 A | 5/2008 |
| WO | WO 2008013120 A1 * | 1/2008 |

* cited by examiner

VEHICLE AIR CONDITIONER CASE

TECHNICAL FIELD

The present invention relates to a vehicle air conditioner in which an expansion valve provided in an air conditioning unit to be disposed in a vehicle cabin is disposed so as to face an opening provided in a toe board that separates an engine compartment and the vehicle cabin.

BACKGROUND ART

Among vehicle air conditioners that air-condition a vehicle cabin, there is a known vehicle air conditioner in the related art in which an opening is provided in a toe board that separates a vehicle engine compartment and the vehicle cabin; an expansion valve provided in an air conditioning unit (HVAC unit: Heating Ventilation and Air Conditioning Unit) is disposed so as to face the opening, and devices disposed in the engine compartment, such as a compressor, a condenser, etc., are connected with an evaporator in the air conditioning unit disposed in the vehicle cabin with a refrigerant pipe via the expansion valve.

In such a vehicle air conditioner, an expansion-valve cover that covers the outer circumference of the expansion valve is provided so as to bridge mating surfaces of top and bottom divided cases that form the air conditioning unit, and the expansion-valve cover is installed in close contact with the toe board at the periphery of the opening thereof with a dash-side gasket sandwiched therebetween, thus preventing infiltration of water that would otherwise pour into the vehicle cabin via the opening from the engine compartment, for example, rain water, water splashed when driving on a flooded road, and so on; however, water enters the expansion-valve cover, inside which the expansion valve is disposed, from the engine compartment via the opening in the toe board. Therefore, if the mating surfaces of the expansion-valve cover and those of the top and bottom divided cases of the air conditioning unit face the portion where the expansion valve is disposed, water may infiltrate the vehicle cabin by being conveyed through the mating surfaces.

Therefore, a rubber water-proofing cover is installed at the portion where the expansion valve is disposed to prevent water from infiltrating the vehicle cabin. Patent Literature 1 discloses a waterproofing structure in which the opening in the toe board is sealed with a waterproofing cover formed of a pair of divided members that sandwich and hold a refrigerant pipe connected to the expansion valve and that are bonded together with a gasket material. In addition, Patent Literature 2 discloses a vehicle air conditioner in which mating surfaces of top and bottom cases, which cover the outer circumference of an expansion valve, are fitted with each other by means of fitting ribs, front surfaces thereof are placed in close contact with a toe board with a front gasket therebetween, and a rear gasket is also provided, via ribs, at a rear opening, through which an indoor-side pipe passes, thus achieving both prevention of flooding of the vehicle cabin and ease of replacing the expansion valve.

CITATION LIST

Patent Literature

{PTL 1} Publication of Japanese Patent, No. 4075689
{PTL 2} Japanese Unexamined Patent Application, Publication No. 2007-118654

SUMMARY OF INVENTION

Technical Problem

However, with a unit in which a water-proofing cover, a gasket, etc. are installed to prevent flooding of the vehicle cabin, as described above, there is a problem in that, because the water-proofing cover, gasket, etc. need to be installed, the ease of assembly is reduced, and, in addition, because the number of parts increases, the unit's structure becomes complex, which also causes an increase in cost, and so on. Because an air conditioning unit (HVAC unit) has a built-in evaporator and is provided with a drainage discharging outlet for discharging drain water produced in the unit to outside the vehicle cabin, problems do not occur even if water that has entered a portion where the expansion valve is disposed through the opening in the toe board infiltrates the interior of the air conditioning unit; however, it is important to prevent flooding of the vehicle cabin via the mating surfaces (fitting surfaces) of the top and bottom divided cases that form the air conditioning unit and those of the expansion-valve cover, and, from this viewpoint, it is desirable to simplify the water-proofing structure.

The present invention has been conceived in light of the above-described circumstances, and an object thereof is to provide a vehicle air conditioner provided with a simple water-proofing structure that is capable of preventing flooding of a vehicle cabin via mating surfaces or the like of an expansion-valve cover and top and bottom divided cases of an air conditioning unit (HVAC unit) without employing a water-proofing cover, etc.

Solution to Problem

In order to solve the above-described problems, the vehicle air conditioner according to the present invention employs the following solutions.

Specifically, a vehicle air conditioner according to an aspect of the present invention is a vehicle air conditioner in which an expansion-valve cover that is horizontally divided into two parts is provided at an outer surface side so as to bridge mating surfaces of top and bottom divided cases of an air conditioning unit disposed in a vehicle cabin; an expansion valve can be disposed in the expansion-valve cover; and, in addition, the interior of the expansion-valve cover is communicates with an engine compartment via an opening provided in a toe board, wherein the expansion-valve cover is provided with a step portion that is formed at top and bottom mating surfaces thereof and in which an inner surface side is made lower and an outer surface side is made higher.

With this configuration, because the step portion in which the inner surface side is made lower and the outer surface side is made higher is formed at the top and bottom mating surfaces of the expansion-valve covers whose interior communicates with the engine compartment via the opening provided in the toe board, in the case in which water enters inside the expansion-valve covers where the expansion valve is disposed from the engine compartment via the opening provided in the toe board, this water may infiltrate the vehicle cabin via the mating surfaces of the expansion-valve cover, which is divided in two, and the mating surfaces of the top and bottom divided cases; however, with the step portion formed at the top and bottom mating surfaces of the expansion-valve cover, it is possible to prevent a situation in which the water causes flooding by flowing over the step portion from the inner surface side, which is made lower, to the outer surface side, which is made higher. Therefore, even if a water-proofing cover is omitted, it is possible to prevent a situation in which water causes flooding of the vehicle cabin by being conveyed from the mating surfaces of the top and bottom expansion-valve covers and those of the top and bottom divided cases over the outer surfaces thereof, and it is possible to simplify the water-proofing structure, to reduce costs through a reduced number of parts, to facilitate assembly, and so on.

With the vehicle air conditioner according to the aspect of the present invention, the step portion may be provided with a gap between a lower surface and a higher surface thereof so as to extend vertically with a large enough widthwise size to prevent water from rising therein by means of capillary action.

With this configuration, because the step portion is provided with a gap that extends vertically between the lower surface and the higher surface thereof with a large enough widthwise size to prevent water from rising therein by means of capillary action, it is possible to prevent a situation in which water that has infiltrated the top and bottom mating surfaces of the expansion-valve cover flows over the step portion by means of capillary action and causes flooding of the vehicle cabin by being conveyed over the outer surfaces from the top and bottom mating surfaces. Therefore, the water-proofing performance can be further improved with a simple configuration in which the gap is merely formed in the step portion, and it is possible to reliably prevent water from infiltrating the vehicle cabin from the mating surfaces of the expansion-valve cover and the top and bottom divided cases.

With the vehicle air conditioner according to the aspect of the present invention, an area between the expansion-valve cover and the top and bottom divided cases may have a partitionless structure so that water that has infiltrated the gap flows toward the interior of the top and bottom divided cases.

With this configuration, because the area between the expansion-valve cover and the top and bottom divided cases has the partitionless structure, so that water that has infiltrated the gap flows toward the interior of the top and bottom divided cases, the water that has infiltrated the gap from the top and bottom mating surfaces of the expansion-valve cover flows directly toward the interior of the top and bottom divided cases through the area between the expansion-valve cover and the top and bottom divided cases, which is partitionless, and is discharged outside the vehicle cabin from a drainage discharging outlet provided in the bottom case of the top and bottom divided cases. Therefore, it is possible to reliably prevent a situation in which water that has infiltrated the gap accumulates therein, flows over the step portion, and causes flooding of the vehicle cabin.

With the vehicle air conditioner according to the aspect of the present invention, air-blocking recessed butt joints may be provided in the lower surface and the higher surface of the step portion, individually at the inner surface side and the outer surface side thereof so as to sandwich the gap therebetween.

With this configuration, because the air-blocking recessed butt joints are provided in the lower surface and the higher surface of the step portion, individually at the inner surface side and the outer surface side thereof so as to sandwich the gap therebetween, with the recessed butt joints provided at the inner surface side and the outer surface side so as to sandwich the gap, it is possible to block the airflow circulating in the top and bottom divided cases to stop it from leaking outside via the gap provided in the expansion-valve cover. Therefore, it is possible to reliably reduce deterioration in air-blocking performance caused by providing a water-proofing gap in the expansion-valve cover.

Advantageous Effects of Invention

With the present invention, in the event that water enters the interior of an expansion-valve cover, where an expansion valve is disposed, from an engine compartment via an opening in a toe board, this water may infiltrate a vehicle cabin via mating surfaces of the expansion-valve cover, which is horizontally divided in two, and mating surfaces of the top and bottom divided cases; however, with a step portion formed at the top and bottom mating surfaces of the expansion-valve cover, because it is possible to prevent a situation in which the water flows over the step portion from the inner surface side, which is made lower, to the outer surface side, which is made higher, and causes flooding, even if a water-proofing cover is omitted, it is possible to prevent a situation in which water causes flooding of the vehicle cabin by being conveyed over the outer surfaces of the expansion-valve cover and the top and bottom divided cases from the mating surfaces thereof expansion-valve cover, and it is possible to simplify the water-proofing structure, to reduce the cost through reducing the number of parts, to facilitate assembly, and so on.

DESCRIPTION OF EMBODIMENT

An embodiment of the present invention will be described below with reference to FIGS. 1 to 6.

Figure 1:
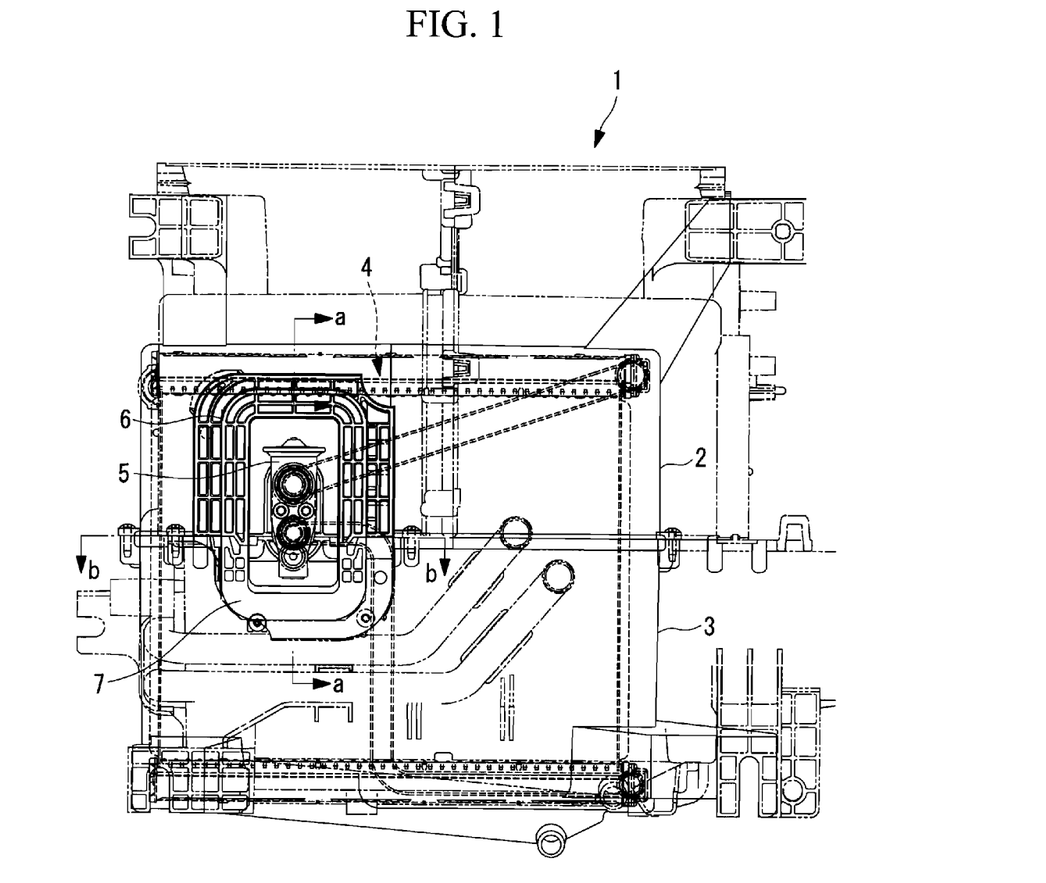
FIG. 1 is a side view of an air conditioning unit of a vehicle air conditioner according to an embodiment of the present invention, viewed from a direction in which an expansion valve is aligned.
Figure 2:
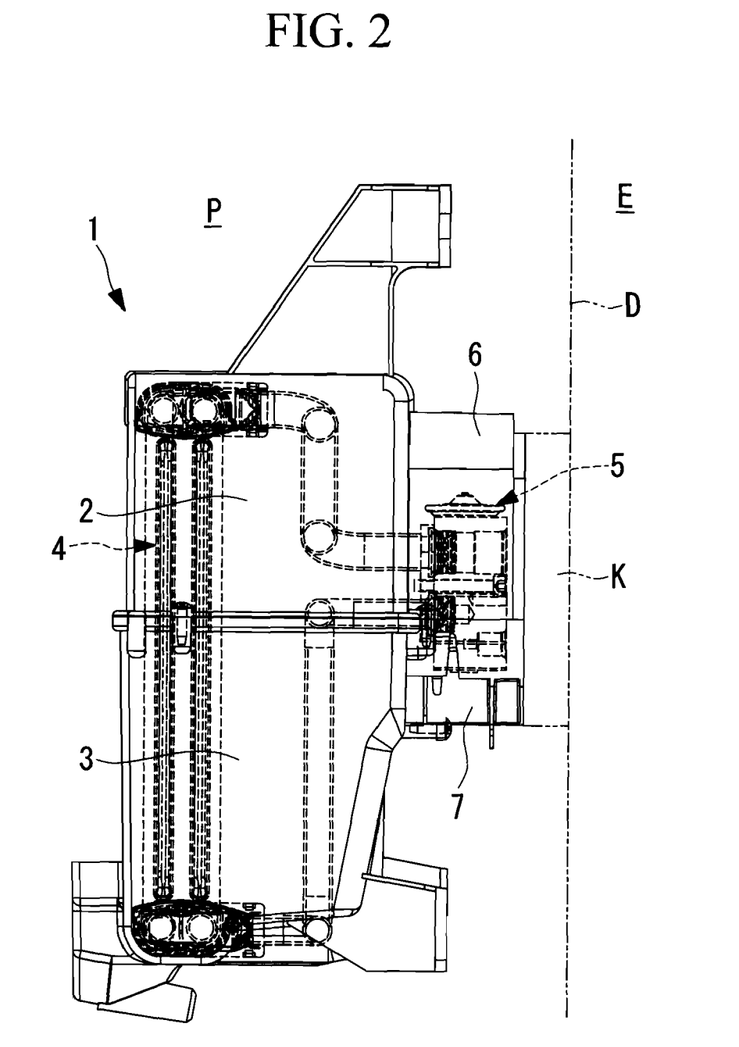
FIG. 2 is a left side view of the air conditioning unit shown in FIG. 1.
Figure 3:
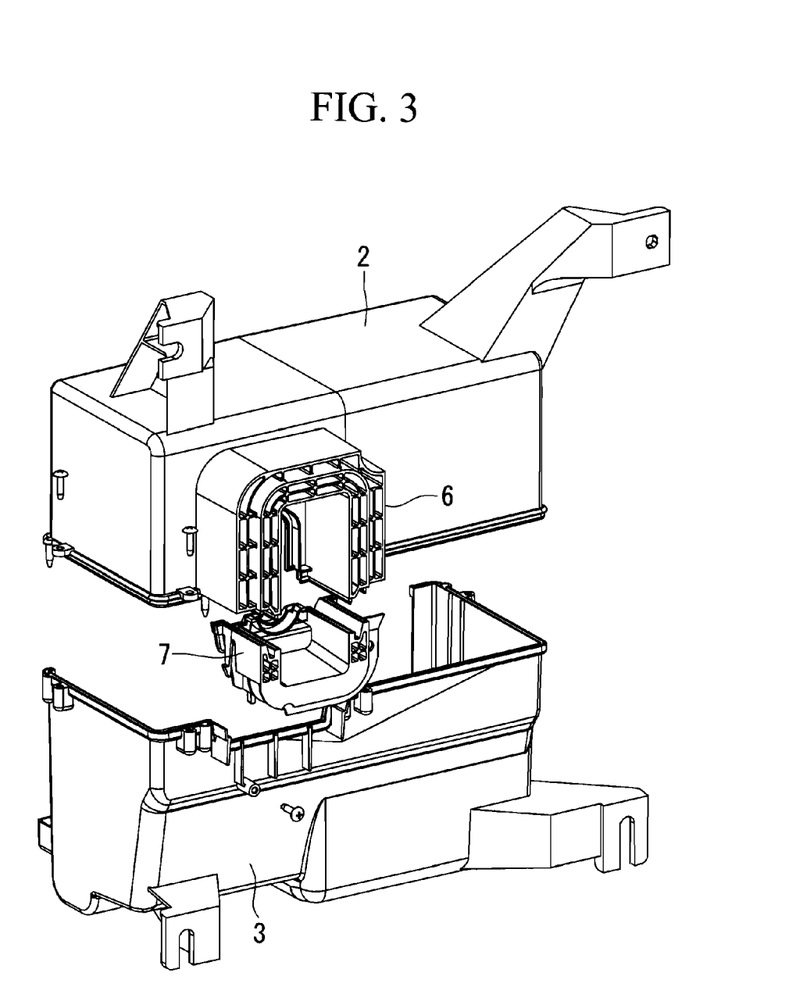
FIG. 3 is an exploded perspective view of top and bottom divided cases of the air conditioning unit shown in FIG. 1.
Figure 4:
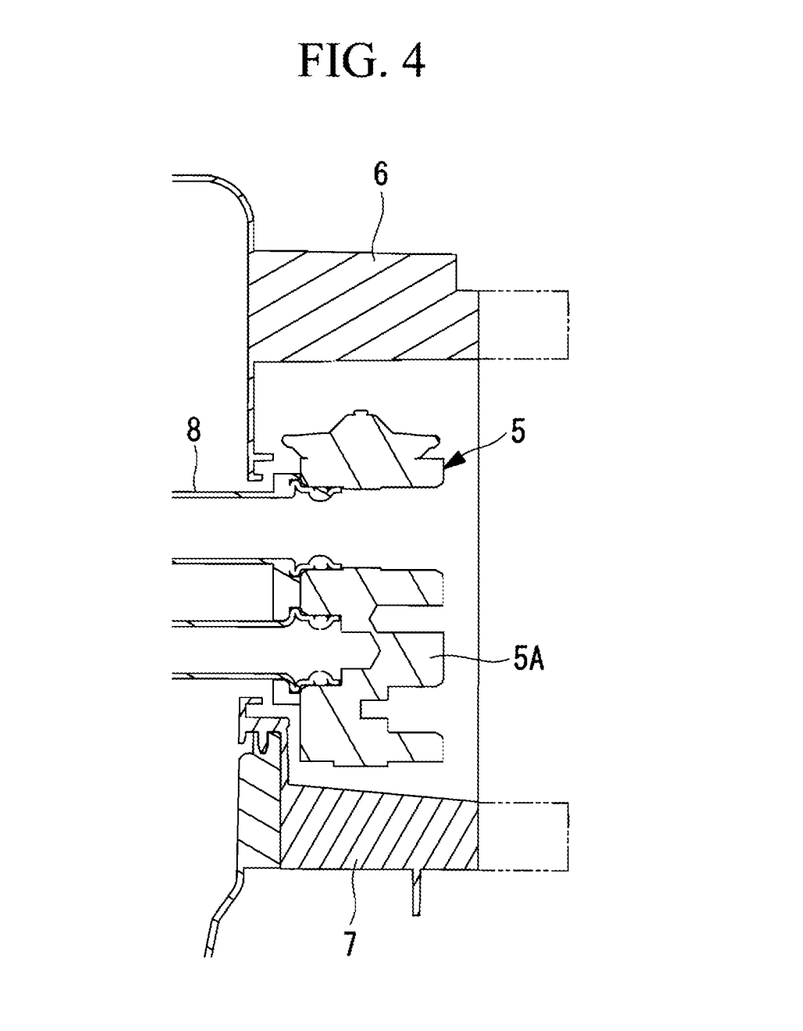
FIG. 4 is a cross-sectional view of the air conditioning unit shown in FIG. 1 taken along a-a.

FIG. 1 is a side view of an air conditioning unit of a vehicle air conditioner according to an embodiment of the present invention, viewed from a direction in which an expansion valve is aligned, FIG. 2 is a left side view thereof, and FIG. 3 is an exploded perspective view of top and bottom divided cases thereof.

An air conditioning unit (HVAC unit: Heating Ventilation and Air Conditioning Unit) 1 of a vehicle air conditioner is provided with a top divided case 2 and a bottom divided case 3, which are divided horizontally. Together with other divided cases (not shown), these top and bottom divided cases 2 and 3 form a unit-case main body which forms the outer shell of the air conditioning unit 1.

Inside the unit-case main body of the air conditioning unit 1, an air channel is formed, which leads to a plurality of air outlets provided on the downstream side from an air inlet provided on the upstream side, and the air conditioning unit (HVAC unit) 1 is formed, as has been known, by disposing in the air channel an evaporator 4, as well as a heater core, an air-mix damper, a plurality of blowout-mode switching dampers, and so forth, which are not illustrated.

As shown in FIG. 2, the air conditioning unit (HVAC unit) 1 is normally installed in a space between a toe board D, which separates a vehicle engine compartment E and a vehicle cabin P, and an instrument panel (not shown), which is installed in the vehicle cabin P, in the left-right direction from the passenger-seat side to a center portion of the vehicle. A refrigerating-cycle expansion valve 5 is installed at side surfaces of the top and bottom divided cases 2 and 3, which face the toe board D, so as to bridge mating surfaces between the top and bottom divided cases 2 and 3. This expansion valve 5 is a so-called block-type expansion valve 5 and is mounted so that a block main body 5A thereof closes an opening provided between the top and bottom divided cases 2 and 3.

The top and bottom divided cases 2 and 3 are provided with expansion-valve covers 6 and 7 that are horizontally divided in two so as to surround the periphery of the expansion valve 5. Although the top and bottom expansion-valve covers 6 and 7 may be individually molded integrally with the top and bottom divided cases 2 and 3, in this embodiment, only the top expansion-valve cover 6 is integrally molded with the top divided case 2; the bottom expansion-valve cover 7 is molded as a separate piece and is fitted with the bottom divided case 3 to form a single piece. As shown in FIG. 2, the top and bottom expansion-valve covers 6 and 7 are installed so that front-end surfaces thereof come in close contact with the toe board D with a dash-side gasket K sandwiched therebetween. Note that division surfaces of the top and bottom expansion-valve covers 6 and 7 and division surfaces of the top and bottom divided cases 2 and 3 are aligned.

The toe board D is provided with an opening (not shown) that for inner surface sides 9 of the top and bottom expansion-valve covers 6 and 7 to communicate with the engine compartment E so as to be connectable to a refrigerant pipe that connects the expansion valve 5 with devices disposed in the engine compartment E, such as a compressor, a condenser, and so on, via the opening. Note that the expansion valve 5 is connected to the evaporator 4 provided in the unit-case main body via a refrigerant pipe 8 (see FIG. 4), and forms a known refrigerating cycle together with the compressor, the condenser, the expansion valve 5, and the evaporator 4, etc.

As described above, the inner surface sides 9 of the top and bottom expansion-valve covers 6 and 7 where the expansion valve 5 is disposed communicate with the engine compartment E and are configured so that water enters from the engine compartment E via the opening in the toe board D. Even if this water enters the unit-case main body (top and bottom divided cases 2 and 3) from a mounting portion of the expansion valve 5, this does not present a problem because a drainage discharging outlet that discharges drain water produced at the evaporator 4 outside the vehicle cabin is provided in the unit case main body, and the water that has entered can be discharged outside the vehicle cabin from the drainage discharging outlet. However, the inner surface sides 9 of the top and bottom expansion-valve covers 6 and 7 face the mating surfaces of the top and bottom expansion-valve covers 6 and 7, and it is essential to avoid a situation in which water that has infiltrated the mating surfaces is conveyed over outer surfaces of the top and bottom expansion-valve covers 6 and 7 and those of the top-bottom divided cases 2 and 3, etc., causing flooding of the vehicle cabin P.

Figure 6:
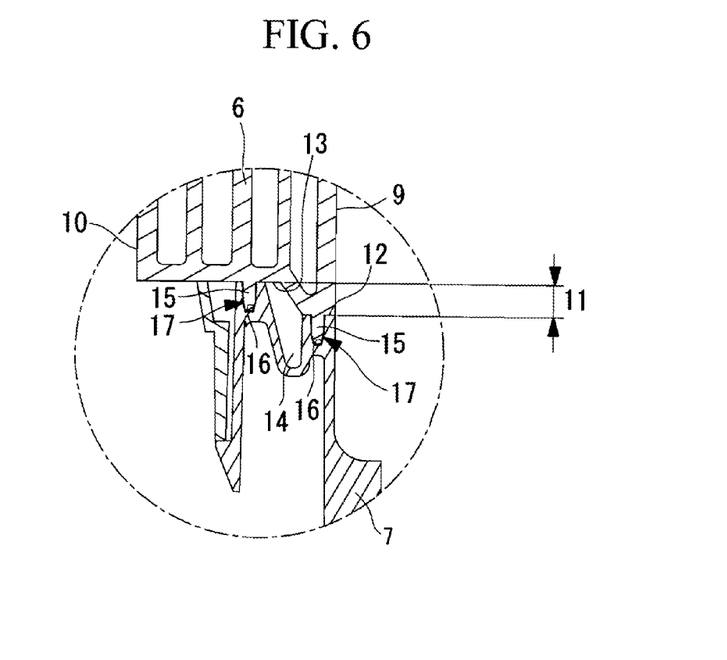
FIG. 6 is a cross-sectional view of the air conditioning unit shown in FIG. 5 taken along c-c.

Therefore, as shown in FIG. 6, step portions 11 in which the inner surface sides 9 are made lower and outer surface sides 10 are made higher are provided at the mating surfaces of the top and bottom expansion-valve covers 6 and 7. In addition, gaps 14 that vertically extend and that have large enough widthwise sizes to prevent water from rising therein by means of capillary action are provided between lower surfaces 12 and higher surfaces 13 of the step portions 11. Note that, although it depends on the height, etc. of the step portions 11, the widthwise sizes of the gaps 14 in this case are set to be at least 1 mm or greater, preferably, about 2 to 5 mm.

In addition, air-blocking recessed butt joints 17, which are formed of fitting ribs 15 that are provided in one of the top and bottom expansion-valve covers 6 and 7 and fitting grooves 16 that are provided in the other to be fitted with the fitting ribs 15, are provided in the lower surfaces 12 and the higher surfaces 13 that form the step portions 11, at the inner surface sides 9 and the outer surface sides 10 of the mating surfaces so as to sandwich the gaps 14, and the recessed butt joints 17 are configured so as to be able to block an airflow flowing in the unit-case main body to stop it from leaking outside via the gaps 14.

Figure 5:
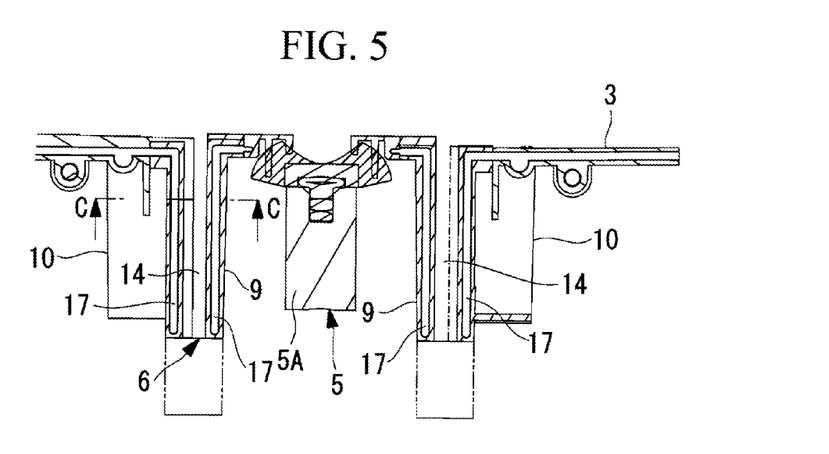
FIG. 5 is a cross-sectional view of the air conditioning unit shown in FIG. 1 taken along b-b.

Furthermore, as shown in FIG. 5, no partition is provided between the top and bottom expansion-valve covers 6 and 7 and the top and bottom divided cases 2 and 3 so that the water that has infiltrated the gaps 14 formed at the mating surfaces of the top and bottom expansion-valve covers 6 and 7 directly flows in the gaps 14 toward the top and bottom divided cases 2 and 3, thus flowing into the unit-case main body (top and bottom divided cases 2 and 3).

With the configuration described above, this embodiment affords the following effects and advantages.

The air conditioning unit (HVAC unit) 1 described above is installed inside the instrument panel in the vehicle cabin P so that the front-end surfaces of the top and bottom expansion-valve covers 6 and 7 are in close contact with the toe board D, with the dash-side gasket K sandwiched therebetween. The refrigerant cycle, which is a closed cycle, is formed by connecting the air conditioning unit 1 and external devices disposed in the engine compartment E, such as the compressor, the condenser, etc. via the refrigerant pipe connected to the expansion valve 5 provided in the air conditioning unit 1, and thus, the air conditioner is installed in the vehicle in an operational form.

The toe board D that separates the engine compartment E and the vehicle cabin P of the vehicle is provided with the opening for connecting the refrigerant pipe; because the inner surface sides 9 of the top and bottom expansion-valve covers 6 and 7 provided on the outer surfaces of the top and bottom divided cases 2 and 3, which form the unit-case main body of the air conditioning unit 1, communicate with the engine compartment E via the opening, water enters the inner surface sides 9 of the top and bottom expansion-valve covers 6 and 7 from the engine compartment E while the vehicle is traveling, etc. Therefore, this water does not cause flooding of the vehicle cabin P from the mating surfaces or the like of the top and bottom expansion-valve covers 6 and 7.

Specifically, because the step portions 11, in which the inner surface sides 9 are made lower and the outer surface sides 10 are made higher, are provided at the mating surfaces of the top and bottom expansion-valve covers 6 and 7, even if water enters the inner surface sides 9 of the top and bottom expansion-valve covers 6 and 7 from the engine compartment E via the opening in the toe board D, it is possible to prevent a situation in which this water causes flooding by flowing over the step portions 11 from the inner surface sides 9, that is, the lower surfaces 12, to the outer surface sides 10, that is, the higher surfaces 13. Therefore, even if a water-proofing cover is omitted, it is possible to prevent a situation in which water infiltrates the vehicle cabin P by being conveyed from the mating surfaces of the top and bottom expansion-valve covers 6 and 7 and those of the top and bottom divided cases 2 and 3 over the outer surfaces thereof, and thus, it is possible to simplify the water proofing structure, to reduce costs through a reduced number of parts, to facilitate assembly, and so on.

In addition, because the gaps 14 that vertically extend and that are large enough to prevent water from rising therein by means of capillary action, that is, having widthwise sizes thereof set to be at least 1 mm or greater, preferably about 2 to 5 mm, are provided between the lower surfaces 12 and the higher surfaces 13 of the step portions 11 described above, it is possible to prevent a situation in which water that has infiltrated the top and bottom mating surfaces of the top and bottom expansion-valve covers 6 and 7 flows over the step portions 11 by means of capillary action and causes flooding of the vehicle cabin P by being conveyed from the top and bottom mating surfaces over the outer surfaces of the top and bottom expansion-valve covers 6 and 7 and the top and bottom divided cases 2 and 3. Therefore, the water-proofing performance can be further improved with a simple configuration in which the gaps 14 are merely formed in the step portions 11, and it is possible to reliably prevent water from infiltrating the vehicle cabin P from the mating surfaces of the top and bottom expansion-valve covers 6 and 7 and those of the top and bottom divided cases 2 and 3.

Note that, even if water that has entered the inner surface sides 9 of the top and bottom expansion-valve covers 6 and 7 or water that has infiltrated the gaps 14 infiltrates the top and bottom divided cases 2 and 3 from the mounting portion of the expansion valve 5 or directly flows into the top and bottom divided cases 2 and 3 from the gaps 14, because the water is discharged outside the vehicle cabin from the drainage discharging outlet provided in the unit-case main body, it does not leak into the vehicle cabin P, thus presenting no particular problem.

In addition, the area between the top and bottom expansion-valve covers 6 and 7 and the top and bottom divided cases 2 and 3 has a partitionless structure, so that water that has infiltrated the gaps 14 flows toward the interior of the top and bottom divided cases 2 and 3. Because of this, the water that has infiltrated the gaps 14 from the top and bottom mating surfaces of the top and bottom expansion-valve covers 6 and 7 flows directly toward the interior of the top and bottom divided cases 2 and 3 through the area between the top and bottom expansion-valve covers 6 and 7 and the top and bottom divided cases 2 and 3, which is partitionless, and is discharged outside the vehicle cabin from the drainage discharging outlet provided in the unit-case main body (top and bottom divided cases 2 and 3). Therefore, it is possible to reliably prevent a situation in which water that has infiltrated the gaps 14 accumulates therein, flows over the step portions 11, and causes flooding of the vehicle cabin P.

Furthermore, in this embodiment, the air-blocking recessed butt joints 17 are provided in the lower surfaces 12 and the higher surfaces 13 of the step portions 11, individually at the inner surface sides 9 and the outer surface sides 10 thereof so as to sandwich the gaps 14 therebetween. Accordingly, the recessed butt joints 17 can block the airflow circulating in the unit-case main body to stop it from leaking outside via the water-proofing gaps 14 provided in the top and bottom expansion-valve covers 6 and 7. Therefore, it is possible to reliably reduce the deterioration in air blocking performance caused by providing the water-proofing gaps 14 in the top and bottom expansion-valve covers 6 and 7.

Note that the present invention is not limited to the above-described embodiment, and appropriate modifications are possible within a range that does not depart from the spirit thereof. For example, although the bottom-side expansion-valve cover 7 of the top and bottom expansion-valve covers 6 and 7 is molded separately from the bottom-side divided case 3 so as to be fitted with the bottom-side divided case 3 in this embodiment, in this case, the fitting portion of the bottom-side expansion-valve cover 7 may be provided with a water-guiding rib for guiding water toward the bottom-side divided case 3. In addition, the lower surfaces 12 of the step portions 11 may be slightly inclined toward the top and bottom divided cases 2 and 3 so that water that has infiltrated the gaps 14 of the step portions 11 is guided toward the top and bottom divided cases 2 and 3.

REFERENCE SIGNS LIST 1 air conditioning unit (HVAC unit)
2 top divided case
3 bottom divided case
5 expansion valve
6 top expansion-valve cover
7 bottom expansion-valve cover
9 inner surface side
10 outer surface side
11 step portion
12 lower surface
13 higher surface
14 gap
17 recessed butt joint
D toe board
E engine compartment
P vehicle cabin

The invention claimed is:

1. A vehicle air conditioner case for an air conditioner unit disposed in a vehicle cabin comprising:
an expansion-valve cover that is provided at an outer surface side of the air conditioning unit disposed in the vehicle cabin so as to bridge a bottom mating surface of a top case and a top mating surface of a bottom case of the air conditioning unit and in which an expansion valve can be disposed,
wherein the expansion-valve cover comprises a top expansion-valve cover and a bottom expansion-valve cover,
wherein a bottom mating part of the top expansion-valve cover and includes first surfaces that are located at an inner surface side of the expansion valve cover, and second surfaces that are located at an outer surface side of the expansion valve cover,
wherein a top mating surface part of the bottom expansion-valve cover also includes the first surfaces that are located at an inner surface side of the expansion valve cover, and second surfaces that are located at an outer surface side of the expansion valve cover,
wherein the second surfaces are parallel to and positioned laterally at a distance from the first surfaces.

2. The vehicle air conditioner case according to claim 1, wherein a gap of 1 mm or greater is provided between a bottom surface of the top expansion-valve cover connecting the first surfaces and the second surfaces, and a top surface of the bottom expansion-valve cover connecting the first surfaces and the second surfaces.

3. The vehicle air conditioner case according to claim 2, wherein the gap communicates with an interior of the air conditioning unit.

4. The vehicle air conditioner case according to claim 2, wherein air-blocking tongue-and-groove joints are provided in the first surfaces and the second surfaces individually at the inner surface side and the outer surface side thereof so as to sandwich the gap therebetween.

5. A vehicle air conditioner for an air conditioner unit disposed in a vehicle cabin comprising;
a vehicle air conditioner case comprising an expansion-valve cover that is provided at an outer surface side of an air conditioning unit disposed in a vehicle cabin so as to bridge a bottom mating surface of a top case and a top mating surface of a bottom case of the air conditioning unit and in which an expansion valve can be disposed, wherein the expansion-valve cover comprises a top expansion-valve cover and a bottom expansion-valve cover, wherein a bottom mating part of the top expansion-valve cover includes first surfaces that are located at an inner surface side of the expansion valve cover, and second surfaces that are located at an outer surface side of the expansion valve cover, wherein a top mating surface part of the bottom expansion-valve cover also includes the first surfaces that are located at an inner surface side of the expansion valve cover, and second surfaces that are located at an outer surface side of the expansion valve cover, and wherein the second surfaces are parallel to and positioned laterally at a distance from the first. surfaces.

* * * * *